(12) United States Patent
Berryessa et al.

(10) Patent No.: US 11,175,210 B2
(45) Date of Patent: Nov. 16, 2021

(54) SYSTEM AND METHODS FOR EVALUATING AN AIR PURIFICATION SYSTEM

(71) Applicant: The Boeing Company, Chicago, IL (US)

(72) Inventors: Brian P. Berryessa, Seattle, WA (US); David R. Space, Everett, WA (US); Timothy J. Arnaud, Everett, WA (US); Stephen M. Trent, Everett, WA (US)

(73) Assignee: The Boeing Company, Chicago, IL (US)

( * ) Notice: Subject to any disclaimer, the term of this patent is extended or adjusted under 35 U.S.C. 154(b) by 231 days.

(21) Appl. No.: 16/449,748

(22) Filed: Jun. 24, 2019

(65) Prior Publication Data
US 2020/0400545 A1     Dec. 24, 2020

(51) Int. Cl.
*G01N 15/08*     (2006.01)
*B01D 46/42*     (2006.01)

(52) U.S. Cl.
CPC ......... *G01N 15/0806* (2013.01); *B01D 46/42* (2013.01); *G01N 15/082* (2013.01); *B01D 2273/18* (2013.01); *B01D 2279/50* (2013.01); *G01N 2015/084* (2013.01)

(58) Field of Classification Search
CPC .................. B01D 46/0086; F24F 11/39; G01N 2015/084; G01N 2015/0662
See application file for complete search history.

(56) References Cited

U.S. PATENT DOCUMENTS 3,614,421 A * 10/1971 Alter .......................... G01T 5/10
                                                                                                             250/435
3,765,225 A * 10/1973 Rivers ....................... G01M 3/20
                                                                                                             73/40.7

(Continued)

FOREIGN PATENT DOCUMENTS

CN          108535166        9/2018

OTHER PUBLICATIONS

Kwanghoon Han et al., "Laboratory comparison of relative performance of gas phase filtration media at high and low O3/NO2 challenge concentrations (ASHRAE RP-1557)", HVAC&R Research, vol. 20, No. 5, Jul. 2014. (Year: 2014).*

(Continued)

*Primary Examiner* — David A. Rogers
(74) *Attorney, Agent, or Firm* — Perman & Green, LLP

(57) ABSTRACT

A method for evaluating an air purification system. The method includes generating, with an air flow generator, a flow of air through a test filter so that an upstream air flow exists an upstream side of the test filter and a downstream air flow exists on a downstream side of the test filter. A multiple contaminant mixture is injected, with a fluid injector, into the upstream air flow. Downstream concentrations for each contaminant of the multiple contaminant mixture in the downstream air flow are measured with a contaminant measurement device. Test filter breakthrough curves for each contaminant of the multiple contaminant mixture in the downstream air flow are generated based on the downstream concentrations for each contaminant of the multiple contaminant mixture.

20 Claims, 10 Drawing Sheets

(56) References Cited

U.S. PATENT DOCUMENTS

| | | | | | |
|---|---|---|---|---|---|
| 4,324,568 | A | * | 4/1982 | Wilcox | B01D 46/0013 239/514 |
| 4,494,403 | A | * | 1/1985 | Bowers | B01D 46/0006 73/40.7 |
| 4,515,007 | A | * | 5/1985 | Herman | G01M 3/20 55/DIG. 9 |
| RE31,952 | E | * | 7/1985 | Wilcox | B01D 46/0004 239/514 |
| 4,875,360 | A | * | 10/1989 | Ziemer | G01M 3/20 73/40.7 |
| 5,256,375 | A | * | 10/1993 | Morris | B01F 5/045 239/429 |
| 5,620,502 | A | * | 4/1997 | Dunne | B01D 15/00 62/908 |
| 5,721,180 | A | * | 2/1998 | Pike | B01D 39/1623 442/346 |
| 6,162,281 | A | * | 12/2000 | Ammann | A62B 18/088 55/DIG. 34 |
| 6,379,551 | B1 | * | 4/2002 | Lee | C08J 5/2243 210/638 |
| 6,508,935 | B2 | * | 1/2003 | Cho | G01N 15/082 210/649 |
| 6,619,112 | B2 | * | 9/2003 | Juhasz | B01D 46/44 73/168 |
| 6,838,005 | B2 | * | 1/2005 | Tepper | A61L 2/0017 210/500.1 |
| 7,010,960 | B1 | * | 3/2006 | Grantham | G01M 3/00 73/40 |
| 7,201,036 | B2 | * | 4/2007 | Custer | B01D 46/0086 73/31.02 |
| 7,334,490 | B2 | * | 2/2008 | Morse | G01N 15/0806 73/865.9 |
| 7,390,343 | B2 | * | 6/2008 | Tepper | B01J 20/08 210/500.1 |
| 7,503,962 | B2 | * | 3/2009 | Attar | B01D 46/008 96/417 |
| 7,552,621 | B2 | * | 6/2009 | Morse | G01N 15/0806 73/38 |
| 7,658,787 | B2 | * | 2/2010 | Morse | B01D 46/0086 95/273 |
| 7,669,490 | B2 | * | 3/2010 | Yoshitome | F24F 3/167 73/865.8 |
| 7,739,926 | B2 | * | 6/2010 | Morse | G01N 15/08 73/865.9 |
| 7,758,664 | B2 | * | 7/2010 | Morse | B01F 5/0603 55/385.2 |
| 7,882,727 | B2 | * | 2/2011 | Morse | G01N 15/0806 73/38 |
| 8,086,424 | B2 | * | 12/2011 | Farmer | B01D 46/0086 702/184 |
| 8,092,575 | B2 | * | 1/2012 | Niezgoda | B01D 46/46 95/26 |
| 8,133,310 | B2 | * | 3/2012 | Huza | B01D 46/4272 96/413 |
| 8,147,757 | B2 | * | 4/2012 | DiLeo | G01N 15/0618 422/68.1 |
| 8,151,630 | B1 | * | 4/2012 | Gardner | A62B 27/00 73/40 |
| 8,205,483 | B1 | * | 6/2012 | Peterson | B01D 46/44 73/38 |
| 8,210,056 | B2 | * | 7/2012 | Pike | F01D 17/08 73/863 |
| 8,328,903 | B2 | * | 12/2012 | Parham | A62B 18/088 95/8 |
| 8,336,717 | B2 | * | 12/2012 | Zia | B01D 27/08 210/472 |
| 8,475,753 | B2 | * | 7/2013 | Eckhoff | F01N 3/085 423/213.2 |
| 8,493,221 | B2 | * | 7/2013 | Cash | G01K 7/427 340/584 |
| 8,549,895 | B2 | * | 10/2013 | Chung | B01D 46/46 73/40.7 |
| 8,685,140 | B2 | * | 4/2014 | Yacoub | F01N 3/027 95/1 |
| 8,969,094 | B2 | * | 3/2015 | Demmer | G01N 30/88 436/163 |
| 9,121,622 | B2 | * | 9/2015 | Dobbyn | B01D 53/04 |
| 9,308,517 | B1 | * | 4/2016 | Peterson | B01J 20/226 |
| 9,333,378 | B2 | * | 5/2016 | Ishikawa | B01D 46/46 |
| 9,435,260 | B2 | * | 9/2016 | Hiner | F02C 7/052 |
| 9,726,591 | B2 | * | 8/2017 | Helle | A61L 2/022 |
| 9,731,982 | B2 | * | 8/2017 | Adams | B01D 39/20 |
| 9,772,271 | B2 | * | 9/2017 | Peacock | G01N 15/06 |
| 9,976,770 | B2 | * | 5/2018 | Cherry, Sr. | F24F 11/30 |
| 9,999,908 | B2 | * | 6/2018 | Dobbyn | B01D 46/46 |
| 10,101,258 | B2 | * | 10/2018 | Kaufman | G01N 33/0011 |
| 10,201,800 | B2 | * | 2/2019 | Glover | B01D 46/0086 |
| 10,287,935 | B2 | * | 5/2019 | Verdegan | F01M 11/10 |
| 10,302,325 | B1 | * | 5/2019 | Osborne | F24F 11/30 |
| 10,345,215 | B1 | * | 7/2019 | Pedalino | G01N 15/0806 |
| 10,386,285 | B2 | * | 8/2019 | Petersen | G01N 15/082 |
| 10,478,765 | B2 | * | 11/2019 | Segard | B01D 46/0086 |
| 10,546,435 | B2 | * | 1/2020 | Carpenter | F02M 35/0208 |
| 10,578,521 | B1 | * | 3/2020 | Dinakaran | G01N 1/2205 |
| 10,605,702 | B2 | * | 3/2020 | Young | G01N 21/8507 |
| 10,663,388 | B2 | * | 5/2020 | Pedalino | F24F 8/10 |
| 10,702,832 | B2 | * | 7/2020 | Giglia | B01D 65/10 |
| 10,955,328 | B2 | * | 3/2021 | Giglia | G01N 33/0011 |
| 2006/0042359 | A1 | * | 3/2006 | Morse | G01M 3/3281 73/40 |
| 2006/0272301 | A1 | * | 12/2006 | Morse | B01D 46/444 55/439 |
| 2007/0079649 | A1 | * | 4/2007 | Nauseda | B01D 46/0023 73/40 |
| 2007/0214870 | A1 | * | 9/2007 | Morse | G01N 15/0806 73/37 |
| 2010/0154513 | A1 | * | 6/2010 | Lin | B01D 46/42 73/38 |
| 2011/0107819 | A1 | * | 5/2011 | Chung | B01D 46/46 73/40.7 |
| 2011/0107917 | A1 | * | 5/2011 | Morse | G01M 3/20 96/417 |
| 2013/0327335 | A1 | * | 12/2013 | Ishikawa | A62B 23/025 128/205.27 |
| 2019/0265122 | A1 | * | 8/2019 | Kawasaki | G01N 15/08 |

OTHER PUBLICATIONS

J. T. Hanley et al., "The Effect of Loading Dust Type on the Filtration Efficiency of Electrostatically-Charged Filters", Indoor Air Conference, Edinburgh, Scotland, Aug. 8-13, 1999. (Year: 1999).*

Chuan He et al., "Evaluation of filter media performance: Correlation between high and low challenge concentration tests for toluene and formaldehyde (ASHRAE RP-1557)", HVAC&R Research, vol. 20, No. 5, Jul. 2014. (Year: 2014).*

Alan C. Veeks, "Technology of Clean Air", National Air Filtration Association, 2010. (Year: 2010).*

Ali Khazraei Vizhemehr et al., "Evaluation of Gas-Phase Filter Performance for a Gas Mixture", Clean—Soil, Air, Water, vol. 42, 2014. (Year: 2014).*

Derrick Crump et al., "Aircraft Cabin Air Sampling Study; Part 1 of the Final Report", The Institute of Environment and Health, Cranfield University, available on the internet at <https://web.archive.org/web/20120727021541/https://dspace.lib.cranfield.ac.uk/handle/1826/5305>, Jul. 27, 2012.. (Year: 2012).*

Wang Ru, "The Measurement and Control Research of Non-metal Material Volatile Organic Compound in Civil Aircraft", Journal of Physics: Conference Series, vol. 1820, 2021 International Conference on Mechanical Engineering, Intelligent Manufacturing and Automation Technology. (Year: 2021).*

Gregory A. Day, "Aircraft Cabin Bleed Air Contaminants: A Review", Civil Aerospace Medical Institute, Federal Aviation Administration, Nov. 2015. (Year: 2015).*

Jun Guan et al., "Measurements of volatile organic compounds in aircraft cabins. Part I: Methodology and detected VOC species in 107 commercial flights", Building and Environment, No. 72, 2014. (Year: 2014).*

(56) References Cited

OTHER PUBLICATIONS

Michael Bagshaw, "Health Effects of Contaminants in Aircraft Cabin Air", Summary Report v2.7, Apr. 2014. (Year: 2014).*
Clement E. Furlong, "Exposure to triaryl phosphates: metabolism and biomarkers of exposure", Journal of Biological Physics and Chemistry, vol. 11, 2011. (Year: 2011).*
John D. Spengler et al., "In-Flight/Onboard Monitoring: ACER's Component for ASHRAE 1262, Part 2", National Air Transportation Center of Excellence for Research in the Intermodal Transport Environment Airliner Cabin Environmental Research (ACER) Program, Apr. 2012. (Year: 2012).*
European Search Report dated Nov. 12, 2020; European Application No. 20181853.
ANSI/ASHRAE Standard 145.2-2016; "Laboratory Test Method for Assessing the Performance of Gas-Phase Air-Cleaning Systems: Air Cleaning Devices", Dec. 31, 2016.

* cited by examiner

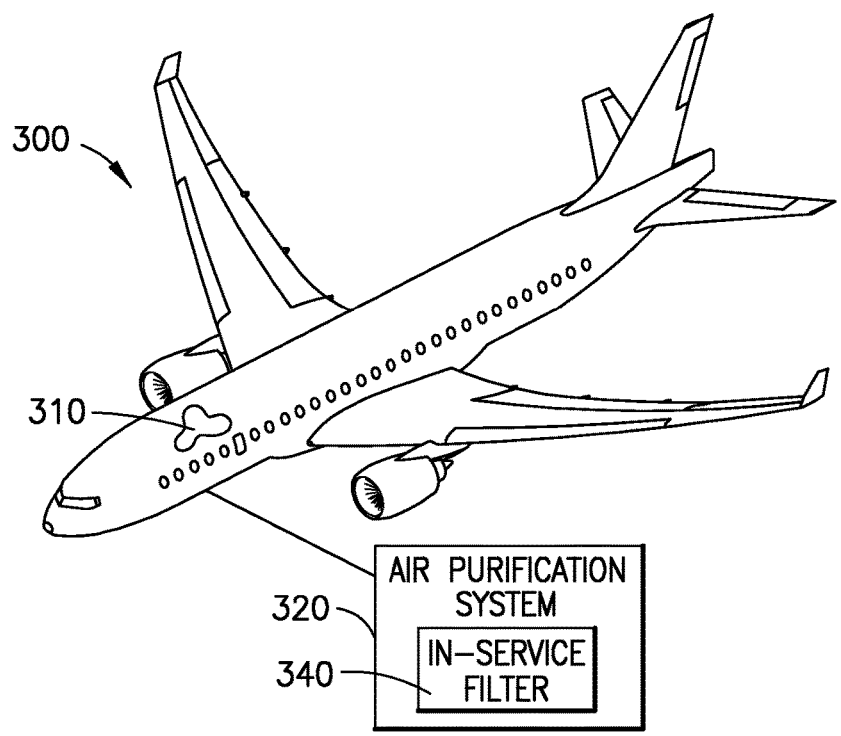
FIG.3
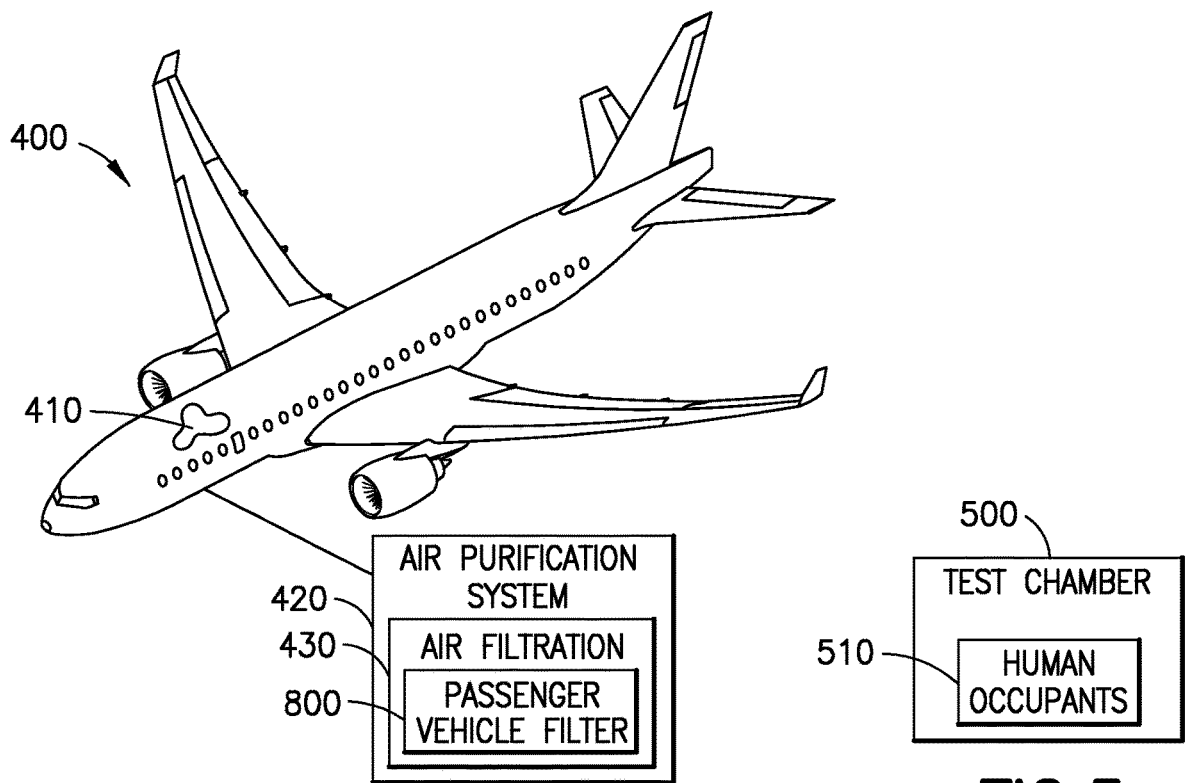
FIG.4
FIG.5

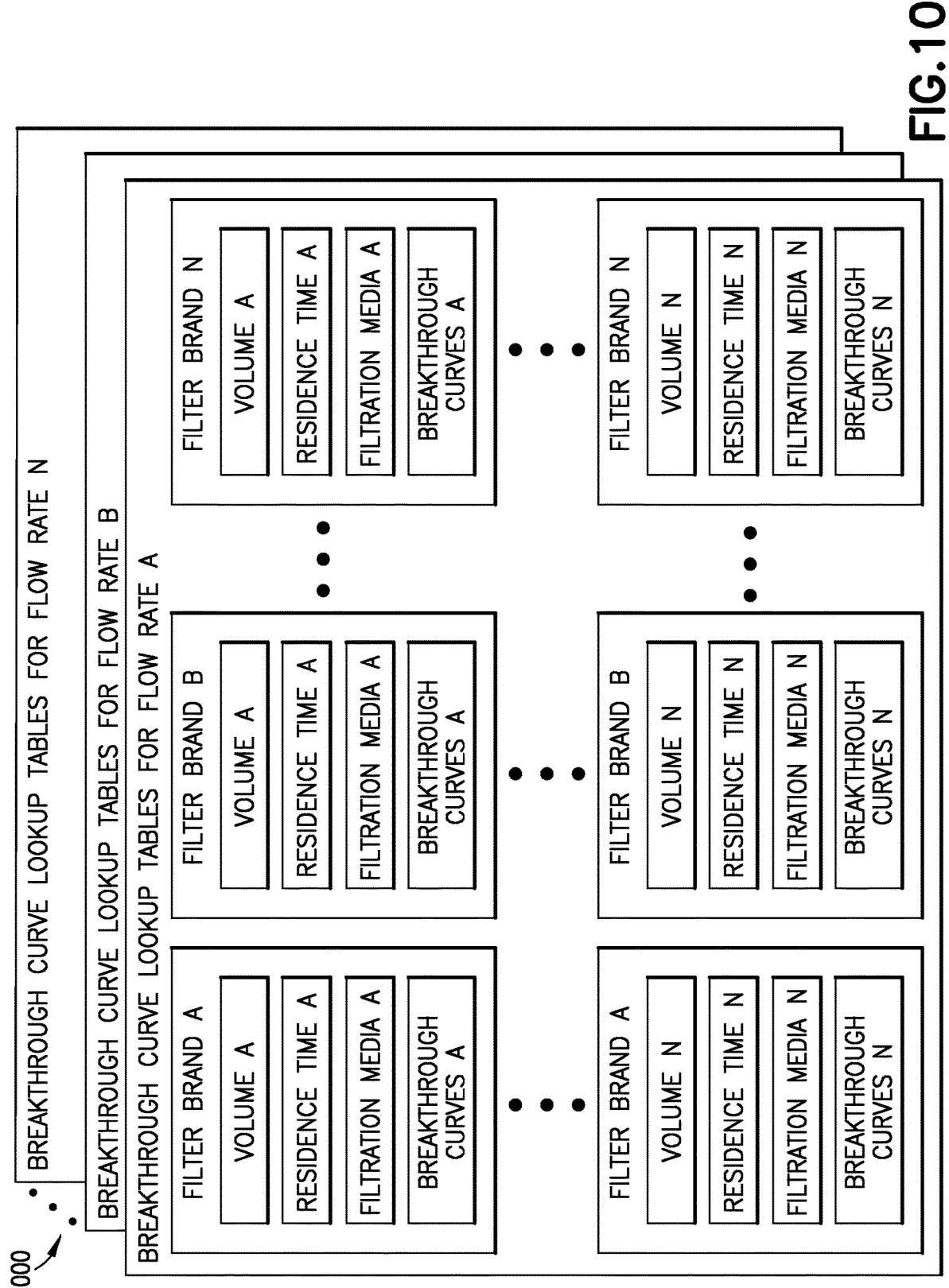

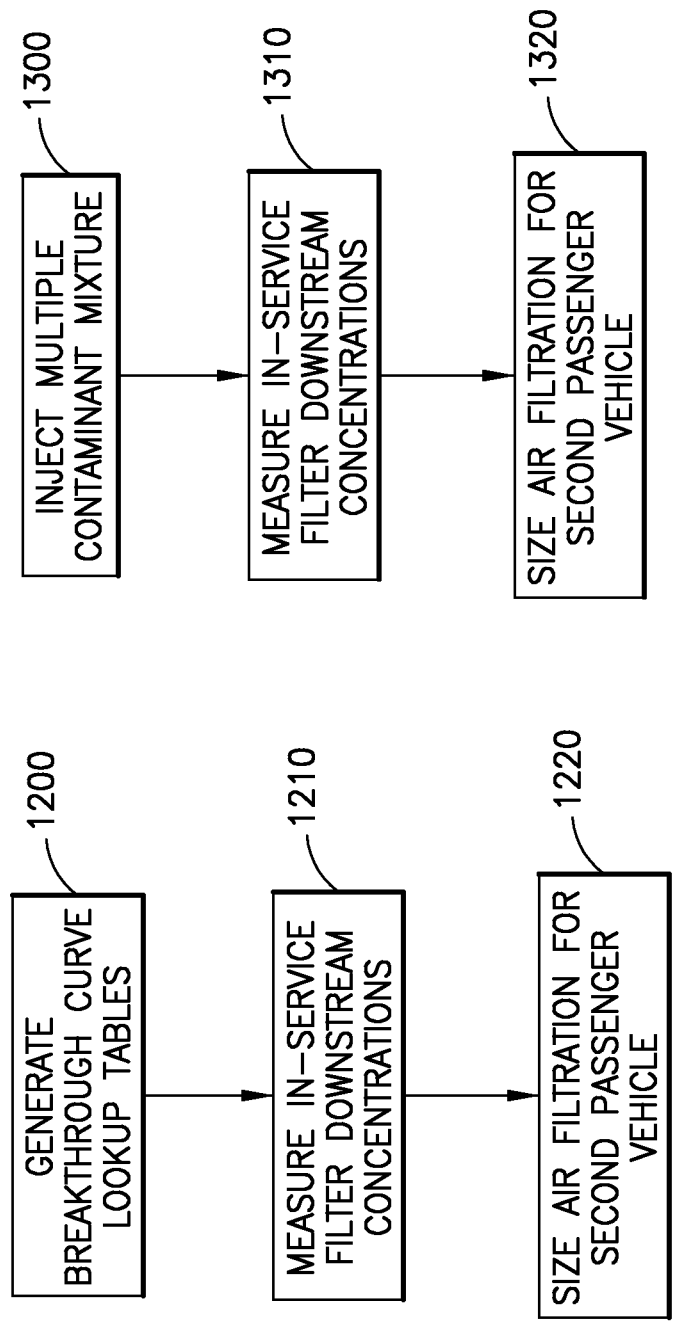

SYSTEM AND METHODS FOR EVALUATING AN AIR PURIFICATION SYSTEM

BACKGROUND

1. Field

The exemplary embodiments generally relate to air purification system and more particularly to evaluating new air purification systems.

2. Brief Description of Related Developments

Typically air purification systems are evaluated using gaseous purification standardized methods as defined in conventional test standards including, but not limited to, ASHRAE (American Society of Heating, Refrigerating and Air-Conditioning Engineers) Standard 145.5. The typical evaluation of the air purification systems using these conventional standards generally involves introducing high concentrations (e.g., typically above 1 ppm or per ASHRAE Standard 145.2) of a single contaminant through an air filter for a short duration of time such as about four hours (or per ASHRAE Standard 145.2).

In some circumstances the conventional test standards may overestimate a lifespan of the air filters, such as by misrepresenting the contaminant concentrations and contaminant sources found in a particular environment. The misrepresented contaminant concentrations and contaminant sources may cause improper sizing of air purification systems for these particular environments and higher than expected contaminants within the particular environments.

SUMMARY

Accordingly, apparatuses and methods intended to address, at least, the above-identified concerns would find utility.

The following is a non-exhaustive list of examples, which may or may not be claimed, of the subject matter according to the present disclosure.

One example of the subject matter according to the present disclosure relates to a method for evaluating an air purification system, the method comprising: generating, with an air flow generator, a flow of air through a test filter so that an upstream air flow exists an upstream side of the test filter and a downstream air flow exists on a downstream side of the test filter; injecting, with a fluid injector, a multiple contaminant mixture into the upstream air flow; measuring, with a contaminant measurement device, downstream concentrations for each contaminant of the multiple contaminant mixture in the downstream air flow; and generating, based on the downstream concentrations for each contaminant of the multiple contaminant mixture, test filter breakthrough curves for each contaminant of the multiple contaminant mixture in the downstream air flow.

Another example of the subject matter according to the present disclosure relates to a method for evaluating an air purification system, the method comprising: generating, with a filter test station, breakthrough curve lookup tables for predetermined air flow rates and corresponding to test filters having predetermined filter volumes and predetermined filtration media, where breakthrough curves of the breakthrough curve lookup tables are generated by injecting, with the filter test station, a multiple contaminant mixture into an upstream air flow on an upstream side of a test filter of the test filters, and measuring downstream concentrations of contaminants in the multiple contaminant mixture in a downstream air flow on a downstream side of the test filter; measuring, with the filter test station, in-service filter downstream concentrations for contaminants of the multiple contaminant mixture in the downstream air flow on a downstream side of an in-service filter, the in-service filter being taken from a first passenger vehicle at a predetermined service life time; and sizing air filtration for a second passenger vehicle based on a correlation between the predetermined service life time and a performance of the in-service filter, where the correlation is determined based on the in-service filter downstream concentrations and the breakthrough curve lookup tables.

Still another example of the subject matter according to the present disclosure relates to a method for evaluating an air purification system, the method comprising: injecting, with a filter test station, a multiple contaminant mixture into an upstream air flow on an upstream side of an in-service filter, the in-service filter being taken from a first passenger vehicle at a predetermined service life time; measuring, with the filter test station, in-service filter downstream concentrations for each contaminant of the multiple contaminant mixture in a downstream air flow on a downstream side of the in-service filter; and sizing air filtration for a second passenger vehicle based on a correlation between the predetermined service life time and a performance of the in-service filter, where the correlation is determined based on the in-service filter downstream concentrations and breakthrough curve lookup tables, the breakthrough curve lookup tables being generated with the multiple contaminant mixture.

BRIEF DESCRIPTION OF THE DRAWINGS

Figure 1:
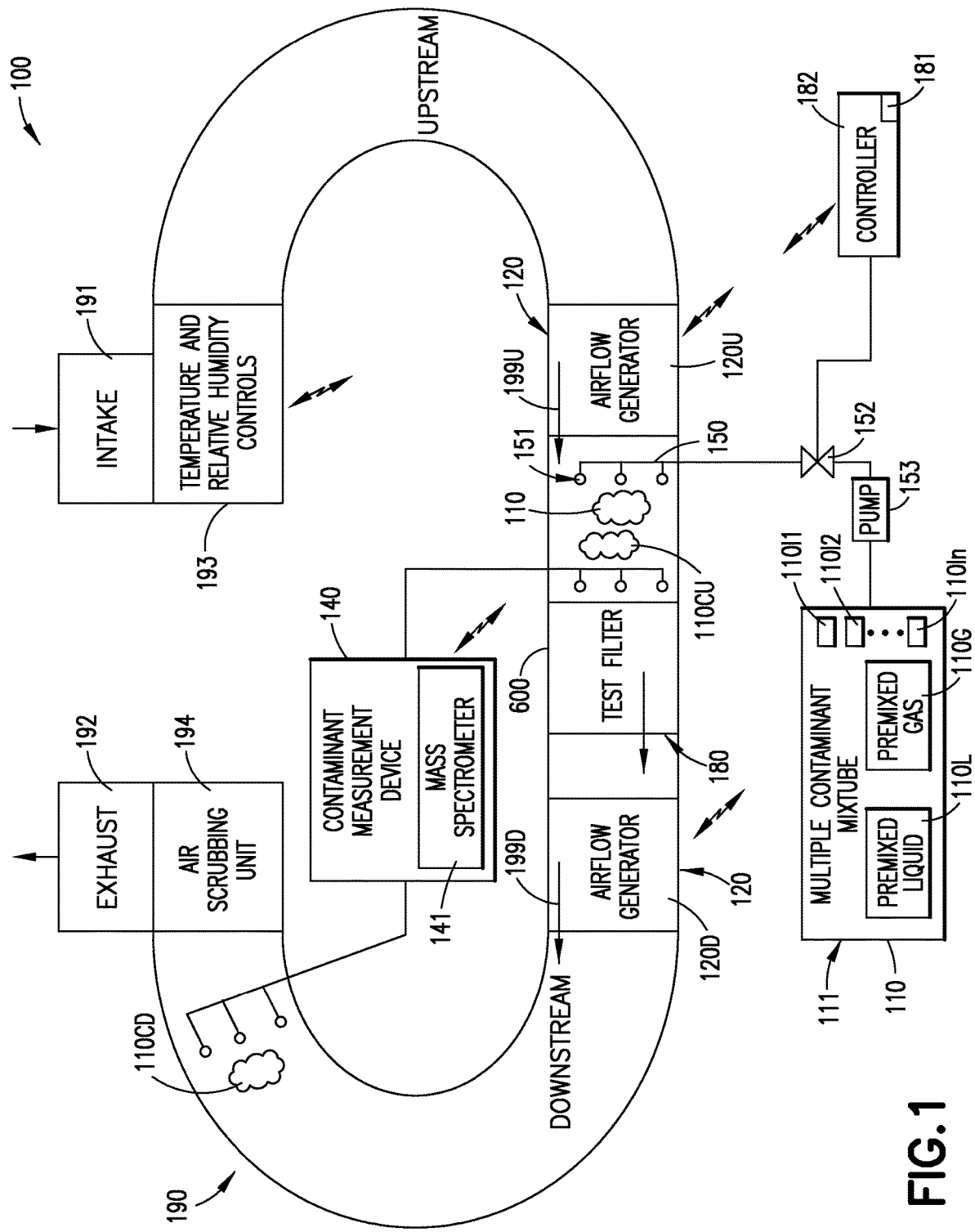
Figure 2:
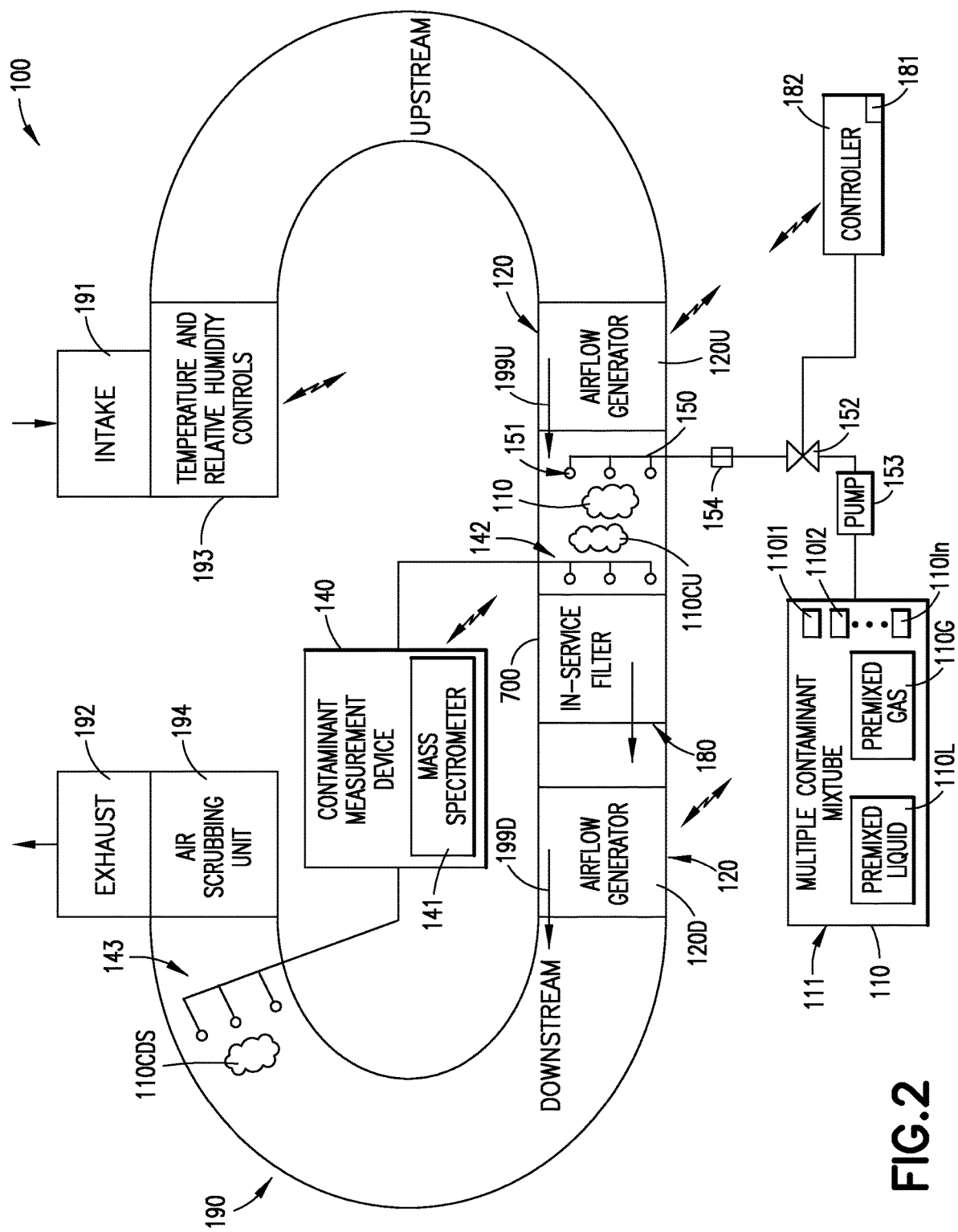
Figures 6, 7, 8:
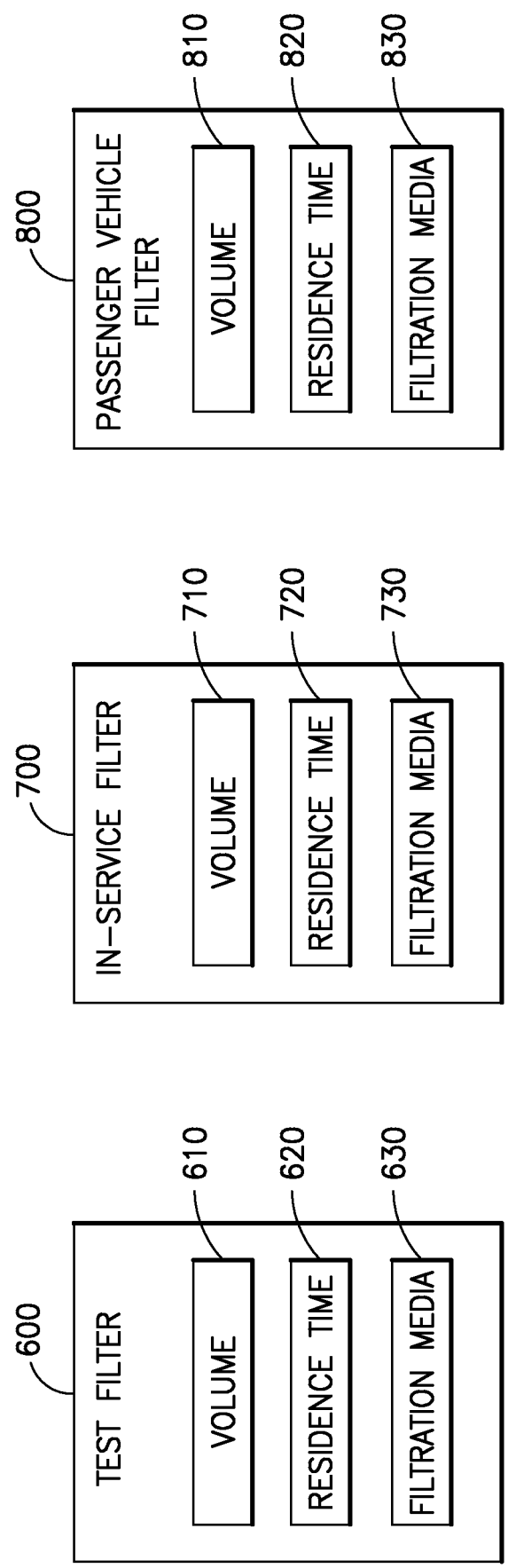
Figure 9A:
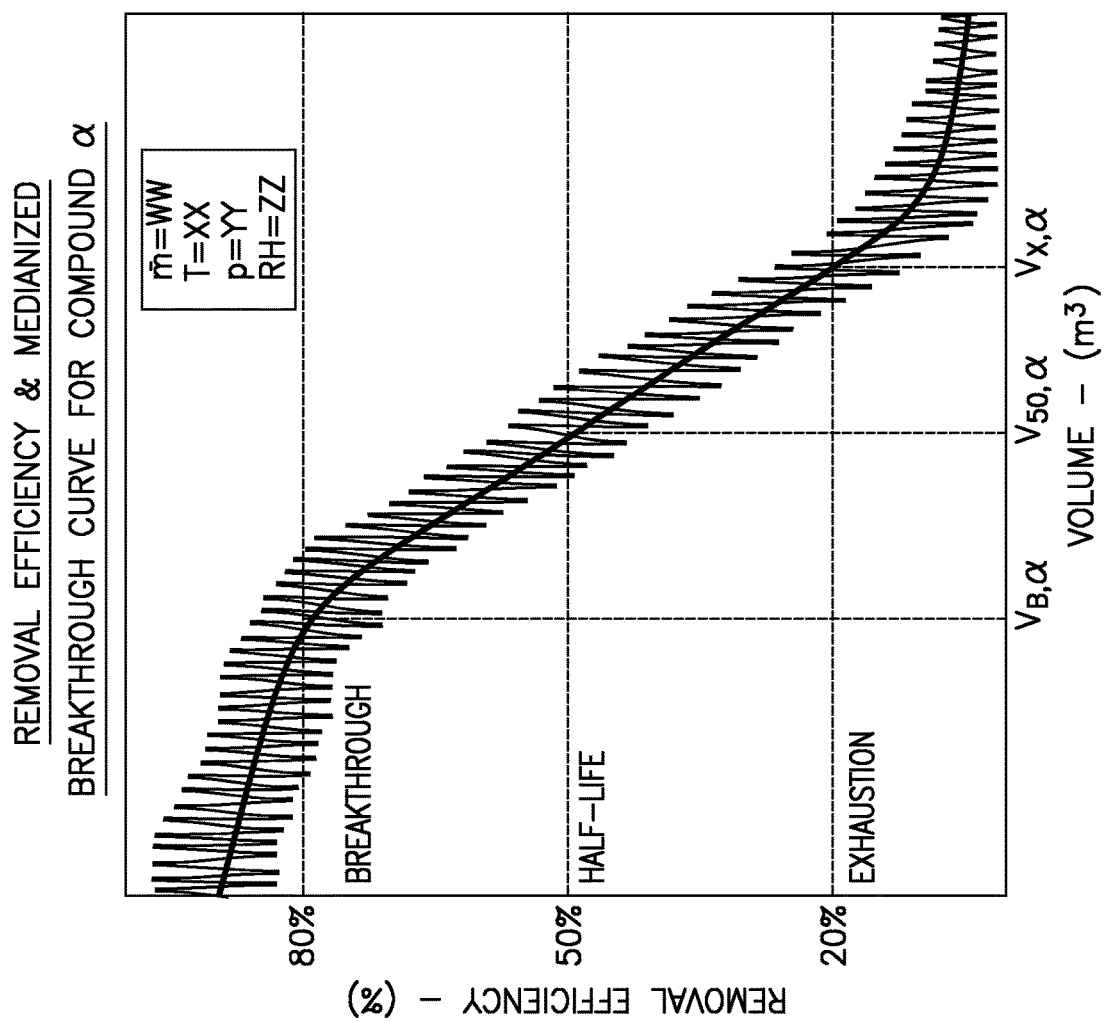
Figure 9B:
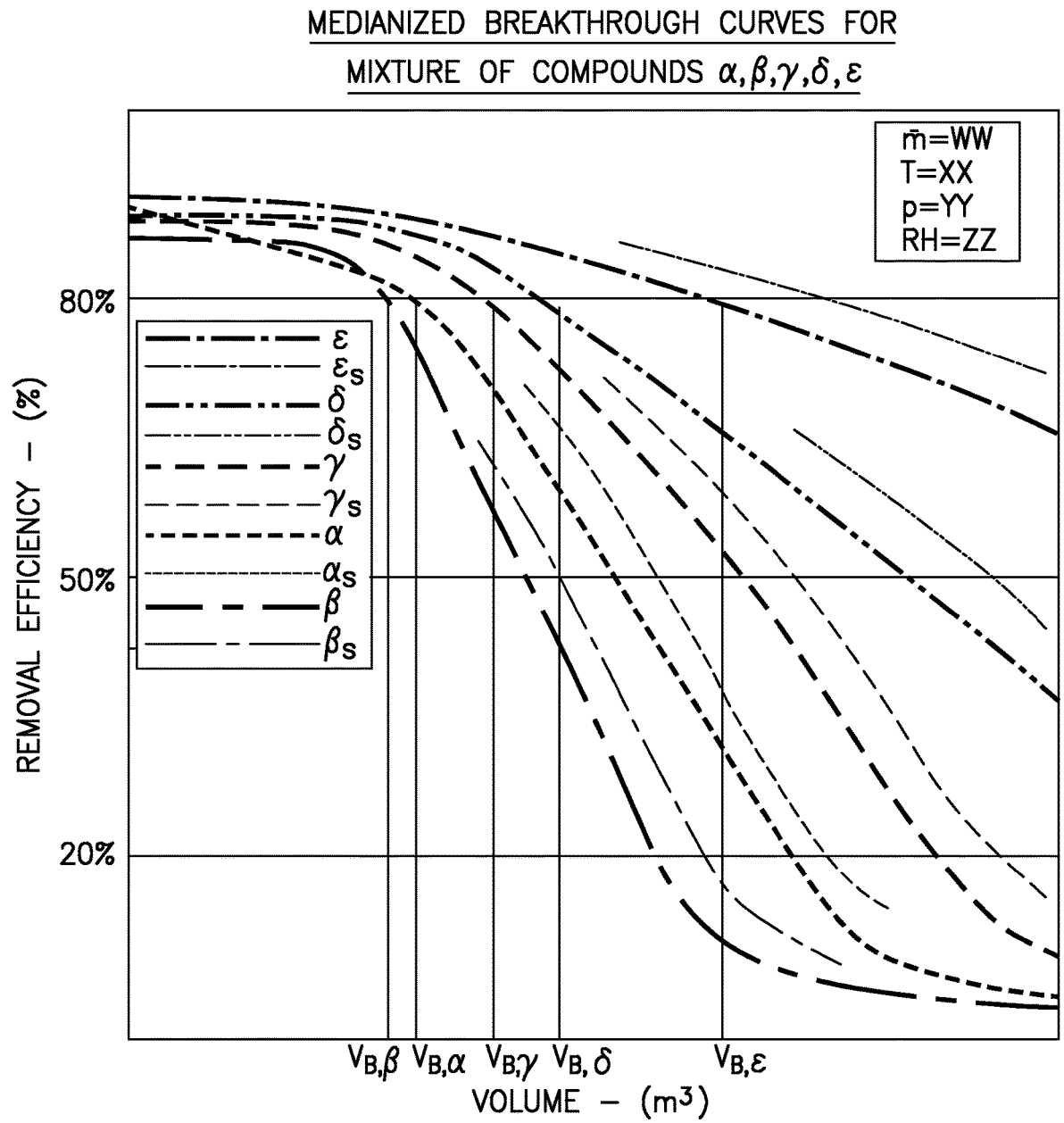
Figure 11A:
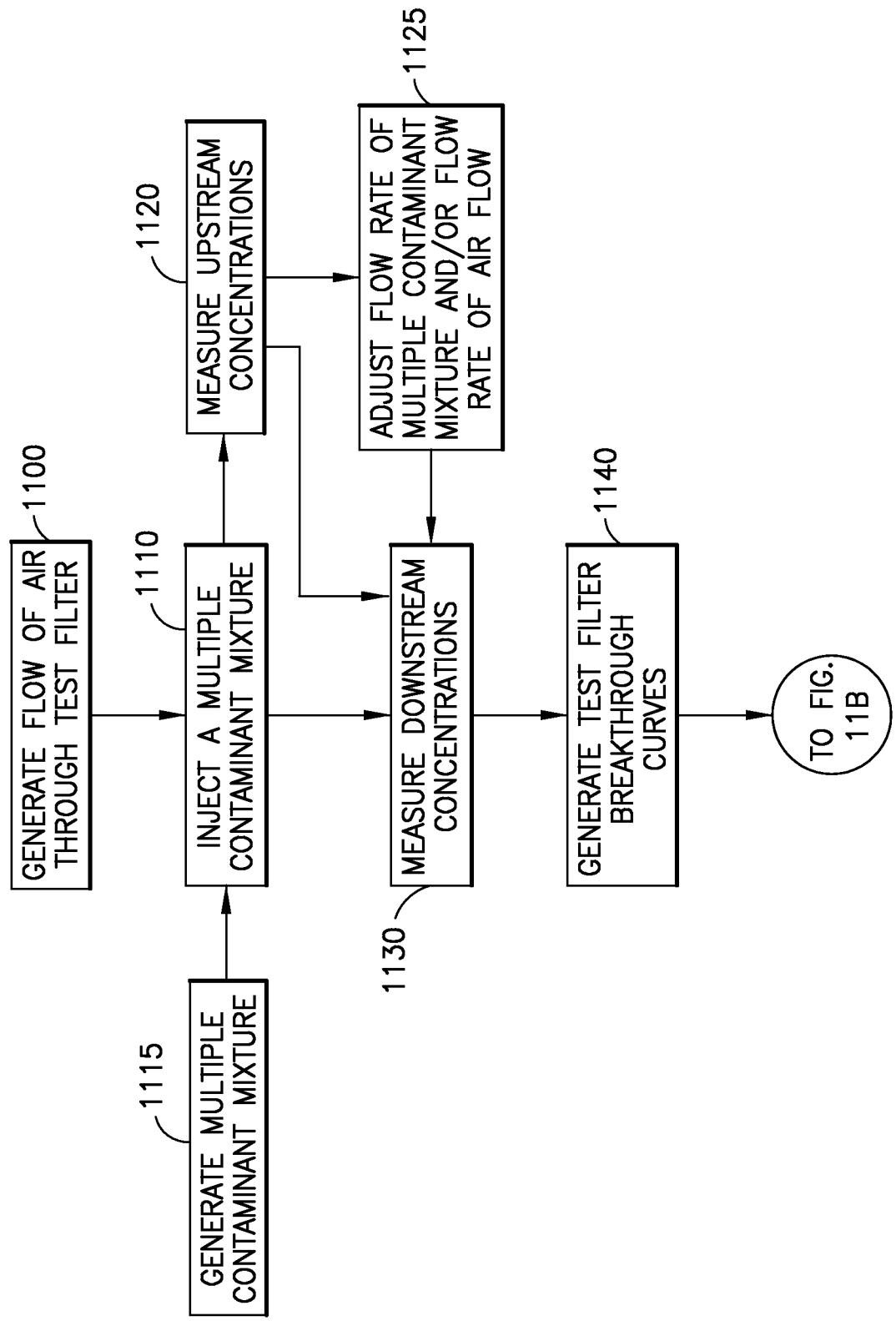
Figure 11B:
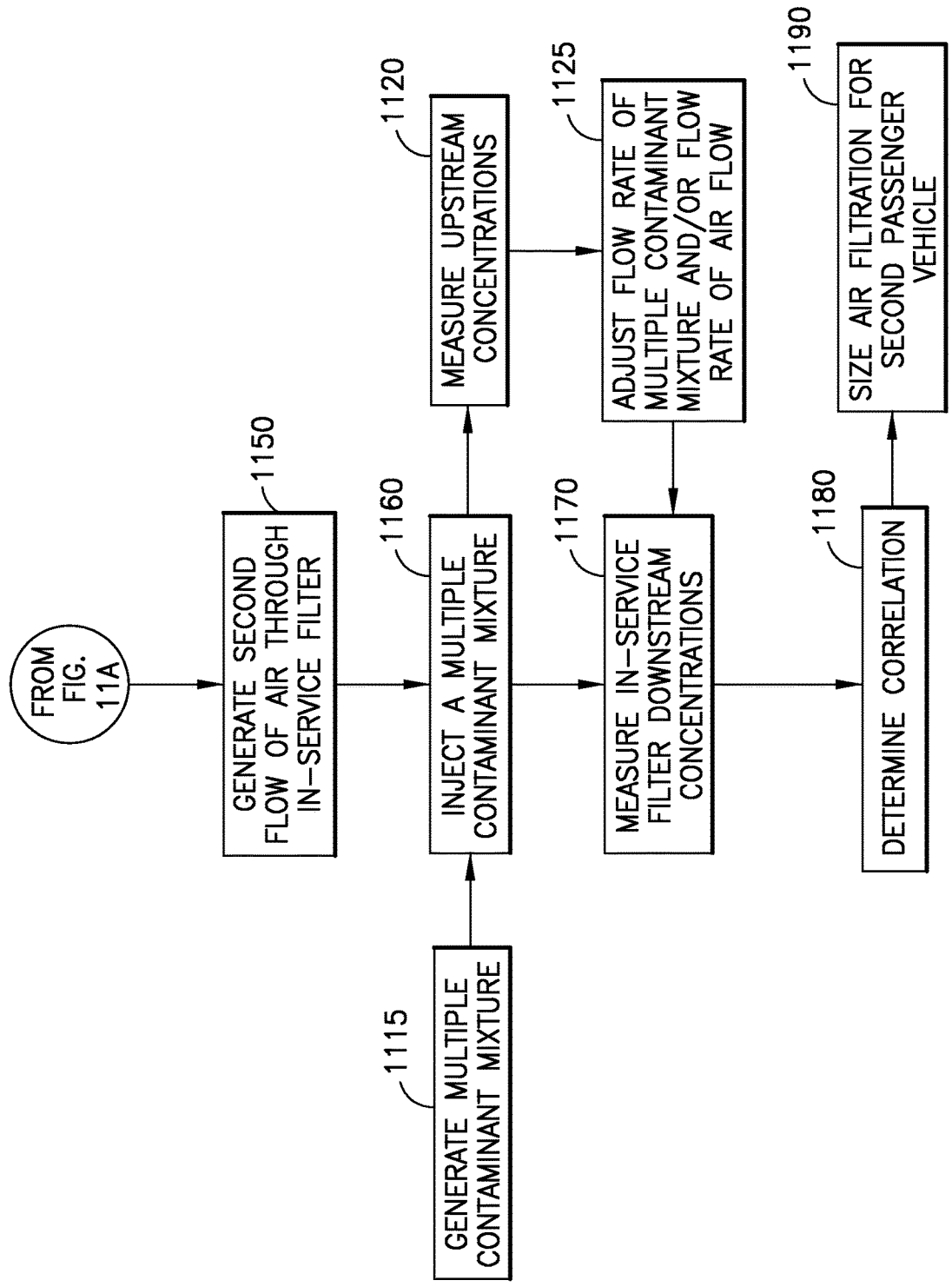

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic illustration of a filter test station 100 in a first configuration in accordance with aspects of the present disclosure;

FIG. 2 is a schematic illustration of the filter test station 100 in a second configuration in accordance with aspects of the present disclosure;

FIG. 3 is a schematic perspective illustration of a passenger vehicle in accordance with aspects of the present disclosure;

FIG. 4 is a schematic perspective illustration of a second passenger vehicle in accordance with aspects of the present disclosure;

FIG. 5 is a schematic illustration of a test chamber in accordance with aspects of the present disclosure;

FIG. 6 is a schematic illustration of a test filter in accordance with aspects of the present disclosure;

FIG. 7 is a schematic illustration of an in-service filter in accordance with aspects of the present disclosure;

FIG. 8 is a schematic illustration of a passenger vehicle filter in accordance with aspects of the present disclosure;

FIGS. 9A and 9B are exemplary breakthrough curves for compounds of a multiple contaminant mixture in accordance with aspects of the present disclosure;

FIG. 10 is a schematic illustration of breakthrough curve lookup tables in accordance with aspects of the present disclosure;

FIGS. 11A and 11B are an exemplary flow diagram of a method for evaluating an air purification system in accordance with aspects of the present disclosure;

FIG. 12 is an exemplary flow diagram of a method for evaluating an air purification system in accordance with aspects of the present disclosure; and FIG. 13 is an exemplary flow diagram of a method for evaluating an air purification system in accordance with aspects of the present disclosure.

DETAILED DESCRIPTION

Referring to FIGS. 1 and 4, aspects of the present disclosure provide for a filter test station 100 and test methods for evaluating an air purification system 420 for a passenger vehicle 400. While the passenger vehicle 400 is illustrated as a commercial aircraft, in other aspects the passenger vehicle may be any suitable vehicle such as military, commercial, or civilian aircraft, submersibles, maritime/recreational water going vessels, spacecraft, and automotive (e.g., armored and unarmored) vehicles. In still other aspects, the present disclosure may be applied to air purification systems for architectural structures (e.g., residential and commercial buildings).

The aspects of the present disclosure evaluate the air purification system 420 based on a multiple contaminant challenge in which a multiple contaminant mixture 110 is used to generate breakthrough curves where the contaminants in the multiple contaminant mixture 110 interact with each other in a competitive adsorption environment to occupy sites on a test filter 600 (i.e., a test air purification filter) through which the multiple contaminant mixture 110 passes. The breakthrough curves (e.g., in adsorption) represent the course of an effluent adsorptive concentration at an outlet of a fixed bed absorber (e.g., the air purification filter) and are generated by selecting contaminants of the multiple contaminant mixture 110 and simultaneously introducing the contaminants of the multiple contaminant mixture 110 to the test filter 600 over prolonged periods of time (as described herein) in predetermined low concentrations (as described herein) so as to mimic (i.e., imitate/simulate) an environment of the passenger vehicle 400 in which the air purification system 420 is to be employed (i.e., the types of contaminants mixed and the relative concentrations thereof in the multiple contaminant mixture 110 mimic an actual or calculated mixture of contaminants for the environment of the passenger vehicle 400).

Referring also to FIG. 2, The aspects of the present disclosure employ testing of in-service filters 700 (i.e., air purification filters taken, at a predetermined in-service filter life, from an in-service passenger vehicle) with the filter test station 100 in combination with the breakthrough curves to size air filtration for the passenger vehicle 400.

Referring to FIGS. 1 and 2, the filter test station 100 includes any suitable ductwork 190 (e.g., conduit) through which fluid may flow. The ductwork having an intake 191 and an exhaust 192. The intake 191 may include any suitable pre-filters to scrub the air of any undesired particles/contaminants prior to injecting the multiple contaminant mixture 110 into the upstream airflow and/or any suitable sensors to determine a composition of the upstream air prior to injecting the multiple contaminant mixture 110. Any suitable temperature and relative humidity controls 193 (e.g., heat exchangers, humidifiers, dryers, etc.) are adjacent the intake 191 for conditioning air introduced into the filter test station 100 to any suitable predetermined temperature and humidity (such as for example, a desired temperature and relative humidity of the environment of the passenger vehicle 400). A filter mount 180 is disposed within the ductwork 190 between the exhaust 192 and the temperature and relative humidity controls 193 so as to define upstream and downstream portions (i.e., relative to the filter mount 180) of the filter test station 100. The filter mount 180 is configured to hold one of both a test filter 600 and an in-service filter 700 within the ductwork 190.

The filter test station 100 includes any suitable air flow generator 120, such as a fan. The air flow generator 120 may be a downstream air flow generator 120D that is located within the ductwork 190 downstream of the filter mount 180; while in other aspects the air flow generator 120 may be an upstream air flow generator 120U that is located within the ductwork 190 upstream of the filter mount 180; while in still other aspects the air flow generator 120 may include both the downstream air flow generator 120D and the upstream air flow generator 120U. The downstream air flow generator 120D is configured to pull air through the test filter 600 or the in-service filter 700 held by the filter mount 180. The upstream air flow generator 120U is configured to push air through the test filter 600 or the in-service filter 700 held by the filter mount 180. One or more of the downstream air flow generator 120D and the upstream air flow generator 120U may be used so as to mimic a configuration of an air purification system 320, of an in-service passenger vehicle 300 from which the in-service filter 700 is taken or to mimic a configuration of the air purification system 420 of the passenger vehicle 400 being evaluated. The air flow generator 120 may be coupled (e.g., wirelessly or through a wired connection) to any suitable controller 182 so that a flow rate (e.g., mass flow rate) of at least an upstream air flow 199U (i.e., upstream of the filter mount 180 and any filter held by the filter mount 180) within the ductwork 190 may be increased or decreased.

The filter test station 100 includes a contaminant container 111 for holding the multiple contaminant mixture 110 as a premixed liquid 110L or a premixed gas 110G. The contaminant container 111 is coupled to a fluid injector 150. The fluid injector 150 has ports 151 disposed at least partially within the ductwork 190 and are configured to inject the multiple contaminant mixture 110 into the upstream air flow 199U within the ductwork 190 upstream of the filter mount 180 and any filter held by the filter mount 180. Any suitable valve 152 may be coupled to and disposed between the contaminant container 111 and the fluid injector 150 for metering the flow rate (e.g., mass flow rate) of multiple contaminant mixture 110 injected into the upstream air flow 199U. Where the multiple contaminant mixture 110 is provided as a premixed liquid 110L the fluid injector 150 may include a pump 153 configured to cause a flow of multiple contaminant mixture 110 from the contaminant container 111 through the ports 151. The fluid injector may also include heaters 154 configured to heat the premixed liquid 110L and change a phase of the multiple contaminant mixture 110 from the premixed liquid 110L to a gaseous phase so that the multiple contaminant mixture 110 exits the ports 150 as a gas. Where the multiple contaminant mixture 110 is provided as a premixed gas 110G the contaminant container 111 may be pressurized so that a pressure of the premixed gas 110G within the contaminant container 111 causes the multiple contaminant mixture 110 to pass through the valve 152 and exit the ports 151. In other aspects, each contaminant 110I1-110In of the multiple contaminant mixture 110 may be provided individually as a liquid or gas form where each individual contaminant is metered through the valve 152 (which in this aspect includes a valve for each contaminant) and injected through the ports 151 into the upstream air flow 199U within the ductwork 190 upstream of the filter mount 180 and any filter held by the filter mount 180. It is noted that reference to each contaminant herein is a reference to each contaminant type (i.e., the type of contaminant compound rather than each particle/molecule of contaminant).

Referring to FIGS. 1, 2, 3 and 4, the multiple contaminant mixture 110 may include any suitable contaminants that may be found within, for example, a passenger vehicle cabin 310, 410 of the in-service passenger vehicle 300 or a passenger vehicle 400 that is being developed or having its air purification system redesigned. In one aspect the passenger vehicle cabin 310, 410 is an aircraft cabin. The type and relative concentration of the contaminants within the multiple contaminant mixture 110 is based on in-service gas samples from the passenger vehicle cabin 310 of an in-service passenger vehicle 300, such as during and/or between vehicle excursions, which in the case of an aircraft the excursions are flights of the aircraft. Referring also to FIG. 5, the type and relative concentration of the contaminants within the multiple contaminant mixture 110 may be based on gas samples taken from a test chamber 500 housing human occupants 510. The types of contaminants that make up the multiple contaminant mixture 110 include, but are not limited to, at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans which are mixed together in relative concentrations that mimic the environment within the passenger vehicle cabin 310 of an in-service passenger vehicle 300.

Still referring to FIGS. 1 and 2, the filter test station 100 includes any suitable contaminant measurement device 140 configured to sense fractions of a contaminant/chemical within air. In one aspect, the contaminant measurement device 140 is mass spectrometer 141; while in other aspects any suitable contaminant measurement device (e.g., summa canister, Tenax® gas sampling tubes, gas chromatography, Proton Transfer Reaction mass spectrometry, etc.) may be used. The contaminant measurement device 140 includes upstream sensors 142 (e.g., gas collectors/sensors for collecting gas samples to effect measuring of the contaminants) disposed in the upstream air flow 199U upstream from the filter mount 180 and any filter held thereby. The contaminant measurement device 140 also includes downstream sensors 143 (e.g., gas collectors/sensors for collecting gas samples to effect measuring of the contaminants) disposed in the downstream air flow 199D downstream from the filter mount 180 and any filter held thereby. Contaminant readings from the contaminant measurement device, as obtained by the upstream sensors 142, are used to adjust/dilute the mixture within the upstream air flow. The contaminant measurement device 140 may be coupled (wirelessly or through a wired connection) to the controller 182 so that the controller receives the sensed contaminant concentrations. The controller may be configured to operate the air flow generator 120 and/or the valve 152 to increase or decrease the flow rate of one or more of the upstream air flow 199U and the multiple contaminant mixture 110 so that the concentration of the multiple contaminant mixture 110 within the upstream air flow 199U is at a predetermined concentration that is substantially at or below 100 ppb. In other aspects, the controller 182 may present the sensed contaminant concentrations to a user where the user manually adjusts the flow rate of one of more of the upstream air flow 199U and the multiple contaminant mixture 110 so that the concentration of the multiple contaminant mixture 110 within the upstream air flow 199U is at a predetermined concentration that is substantially at or below 100 ppb. The contaminant readings from the contaminant measurement device, as obtained by the upstream sensors 142 and downstream sensors 143, are used to generate the breakthrough curves.

The filter test station 100 also includes any suitable air scrubbing unit 194 disposed upstream from the exhaust 192. The air scrubbing unit 194 is configured in any suitable manner to scrub or remove the contaminants from the multiple contaminant mixture 110, that may exist in the downstream air flow 199D, from the downstream air flow 199D prior to the exhaustion of the downstream air flow 199D from the exhaust 192.

Referring to FIGS. 1, 6, 9A, 9B, 10, 11A, and 11B a method for evaluating an air purification system 420 using the filter test station 100 includes generating, with the air flow generator 120, a flow of air through a test filter 600 (FIG. 11A, Block 1100). The flow of air is generated so that the upstream air flow 199U exists on the upstream side of the test filter 600 and the downstream air flow 199D exists on the downstream side of the test filter 600. In one aspect, the flow of air is pushed through the test filter 600 by the air flow generator 120; while in other aspects, the flow of air is pulled through the test filter 600 by the air flow generator 120; while in still other aspects, the flow of air may be pushed and pulled through the test filter 600 by the air flow generator 120. Pushing and/or pulling the air through the test filter may mimic the air purification system 320 of the in-service passenger vehicle 300.

The multiple contaminant mixture 110 is injected into the upstream air flow (FIG. 11A, Block 1110) with the fluid injector 150. In one aspect, the multiple contaminant mixture 110 is provided to the fluid injector 150 as a premixed liquid or a premixed gas, such as in the manner describe above; while in other aspects, each contaminant 110I1-110In of the multiple contaminant mixture is individually provided to the fluid injector 150, such as in the manner described above. Providing the multiple contaminant mixture 110 as a premixed liquid or a premixed gas presets the relative concentrations of the contaminants in the mixture to simplify deployment of the multiple contaminant mixture 110. Individually providing each contaminant 110I1-110In of the multiple contaminant mixture 110 may provide for tailoring of the relative concentrations of the multiple contaminant mixture 110 during deployment of the multiple contaminant mixture 110. In one aspect, the multiple contaminant mixture 110 is injected into the upstream air flow 199U at a fixed rate; while in other aspects, the multiple contaminant mixture 110 is injected into the upstream air flow 199U at a varied rate. Introducing the multiple contaminant mixture 110 at a fixed or varied rate may effect mimicking, e.g., the environment within the passenger vehicle cabin 310 at different points of operation of the in-service passenger vehicle 300.

Upstream concentrations 110CU for each contaminant 110I1-110In of the multiple contaminant mixture 110 in the upstream air flow 199U may be measured with the contaminant measurement device (FIG. 11A, Block 1120). One or more of both the flow rate of the multiple contaminant mixture 110 and the flow rate of the upstream air flow 199U may be adjusted (FIG. 11B, Block 1125), based on the upstream concentrations 110CU, to dilute the multiple contaminant mixture 110 to a predetermined upstream concentration. The predetermined upstream concentration is less than or equal to 100 parts per billion of the multiple contaminant mixture 110 within the upstream air flow 199U. The multiple contaminant mixture may be generated (FIG. 11A, Block 1115) based on in-service gas samples from the passenger vehicle cabin 310 of an in-service passenger vehicle 300 (FIG. 3), such as during and/or between vehicle excursions, which in the case of an aircraft the excursions are flights of the aircraft and/or based on gas samples taken from a test chamber 500 housing human occupants 510 (FIG. 5) as described above.

Downstream concentrations 110CD for each contaminant 110I1-110In (i.e., the downstream concentrations of each unfiltered contaminant type) of the multiple contaminant mixture 110 in the downstream air flow 199D is measured with the contaminant measurement device 140 (FIG. 11A, Block 1130). Based on the downstream concentrations 110CD for each contaminant 110I1-110In of the multiple contaminant mixture, test filter breakthrough curves (see, e.g., FIGS. 9A and 9B for exemplary breakthrough curves) are generated for each contaminant 110I1-110In of the multiple contaminant mixture 110 in the downstream air flow 199D (FIG. 11A, Block 1140). The test filter 600 is a new filter (i.e., unused filter that has never been placed in service within the in-service passenger vehicle 300) and the downstream concentrations 110CD for each contaminant 110I1-110In of the multiple contaminant mixture 110 are obtained over a time period ranging from several hundred hours to several thousand hours. Here, the breakthrough curves are generated based on low contaminant exposures over long time periods so that the breakthrough curves may accurately represent the environmental conditions within the passenger vehicle cabin 310 during in-service use of the in-service passenger vehicle 300. For example, the breakthrough curves represent performance characteristics of filter media, residence time (which may be impacted by a size/volume of the filter and air flow rate through the filter), and the concentration of contaminants of interest and the properties of those contaminants. Every contaminant has a separate residence time and performs/interacts differently with the filtration media such that a filter may perform exceptionally well with one type of contaminant, but not as well with another type of contaminant. Breakthrough curves based on a single type of contaminant may lead one to believe the filter is more efficient than the filter actually is. The breakthrough curves generated in accordance with the aspects of the present disclosure are generated in the competitive adsorption environment provided by the multiple contaminant mixture 110 which is introduced to the test filter 600 at low concentrations (e.g., equal to or less than 100 ppb) for prolonged time periods so that the breakthrough curves may indicate actual in-service performance of the test filter 600.

In one aspect, the time period during which the downstream concentrations 110CD for each contaminant of the multiple contaminant mixture 110 are obtained is a continuous time period; while in other aspects, the time period is divided into several test intervals (i.e., where the multiple contaminant mixture 110 is provided to the test filter 600) with time periods of static test conditions (i.e., where substantially no air flow passes through the test filter 600) between the test intervals; while in still other aspects, the time period is divided into several test intervals (i.e., where the multiple contaminant mixture 110 is provided to the test filter 600) with time periods of clean air flow (air flow through the filter without the presence of the multiple contaminant mixture 110), through the test filter 600, between test intervals. The test intervals and time periods of static test conditions and/or clean air flow are configured to mimic excursion patterns of the in-service passenger vehicle 300.

Each test filter 600 includes a predetermined filter volume 610 (e.g., length, width, and thickness) and a predetermined filtration media 630 (e.g., activated carbon, zeolite, metal organic frameworks, catalysts, etc.) that define a test filter type. Each test filter 600 is also manufactured by a respective filter manufacturer. The breakthrough curves are generated for test filters 600 of different types and corresponding to filters different filter manufacturers (i.e., there are breakthrough curves for each of filter types A, B, C, etc. of filter manufacturer A, there are breakthrough curves for each of filter types A, B, C, etc. of filter manufacturer B, etc.). The breakthrough curves may also correspond to the flow rate of air passing through the test filter 600, where an increased flow rate of air passing through the test filter 600 may decrease the residence time 620 of a test filter having predetermined characteristics and a decreased flow rate of air passing through the test filter 600 may increase the residence time 620 of the test filter having the same predetermined characteristics. As such, the breakthrough curves for each multiple contaminant mixture 110 may be categorized by one or more of filter type (i.e., filter volume and/or filtration media), filter manufacturer (i.e., filter brand), residence time, and flow rate. These categorized breakthrough curves may be generated by the controller 182 and stored within any suitable memory of the controller 182 so as to form breakthrough curve lookup tables 1000 (FIG. 10). There may be different sets of breakthrough curve lookup tables for each configuration of the multiple contaminant mixture 110 (i.e., each configuration having different combinations of contaminants and/or different respective concentrations of contaminants), each mass flow rate of air flowing through the filter, each temperature, each pressure, and/or each relative humidity that make up a corresponding environment set up within the filter test station 100.

Referring to FIGS. 2, 7, 9A, 9B, 10, 11A, and 11B, a second flow of air through an in-service filter 700 is generated, with the air flow generator 120 (FIG. 11B, Block 1150). The second flow of air is generated so that the upstream air flow 199U exists an upstream side of the in-service filter 700 and the downstream air flow exists 199D exists on a downstream side of the in-service filter 700. The in-service filter 700 is taken from a first (i.e., in-service) passenger vehicle 300 at a predetermined service life time of the in-service filter 700 with a known set of parameters. The known set of parameters include, but may not be limited to, a removal time of the in-service filter 700, the makeup of the environment within the passenger vehicle cabin 310 from which the in-service filter was taken, a filtration media 730 of the in-service filter, a volume 710 of the in-service filter 700, and a residence time 720 of the in-service filter 700 (which residence time 720 is the same as the residence time 620 (FIG. 6) for the test filter 600 (FIG. 6)). For exemplary purposes only, the in-service filter 700 may be removed from the in-service passenger vehicle 300 when the in-service filter 700 has about 30% to about 20% remaining useful life or at any other suitable predetermined time during the life of the in-service filter 700.

The multiple contaminant mixture 110 is injected into the upstream air flow 199U by the fluid injector 150 (FIG. 11B, Block 1160), and in-service filter downstream concentrations 110CDS for each contaminant 110I1-110In of the multiple contaminant mixture 110 in the downstream air flow 199D is measured with the contaminant measurement device (FIG. 11B, Block 1170). The in-service filter downstream concentrations 110CDS for each contaminant 110I1-110In of the multiple contaminant mixture 110 are obtained after a restoration time period that accounts for off-gassing of the in-service filter 700 between a time the in-service filter 700 was taken from the in-service passenger vehicle 300 and testing of the in-service filter 700 in the filter test station 100, so as to remove off-gassing effects from the in-service filter downstream concentrations 110CDS. In one aspect, the restoration time period ranges from fifty hours to one-hundred hours; while in other aspects, the restoration time period may be more than one-hundred hours or less than fifty hours. The multiple contaminant mixture 110 provided to the in-service filter 700 is the same multiple contaminant mixture 110 provided to the test filter 600 and is generated FIG. 11B, Block 1115) in the same manner. In the manner described above, upstream concentrations 110CU for each contaminant 110I1-110In of the multiple contaminant mixture 110 in the upstream air flow 199U may be measured with the contaminant measurement device (FIG. 11A, Block 1120). One or more of both the flow rate of the multiple contaminant mixture 110 and the flow rate of the upstream air flow 199U may be adjusted (FIG. 11B, Block 1125), based on the upstream concentrations 110CU, to dilute the multiple contaminant mixture 110 to a predetermined upstream concentration. The predetermined upstream concentration is less than or equal to 100 parts per billion of the multiple contaminant mixture 110 within the upstream air flow 199U.

Based on the test filter breakthrough curves (see FIGS. 9A, 9B, and 10) and the in-service filter downstream concentrations 110CDS, a correlation between the predetermined service life time and a performance of the in-service filter 700 is determined (FIG. 11B, Block 1180). For example, the contaminant removal performance of the in-service filter 700 is compared to a breakthrough curve that corresponds with the test setup of the in-service filter (i.e., substantially the same temperature, pressure, relative humidity, air flow rate, multiple contaminant mixture, etc.) to determine where the removal performance of the in-service filter 700 is in relation to (e.g., deviates from) the breakthrough curve. Referring to FIG. 9B, and for exemplary purposes only, a correlation exists where the removal performance (see curves for $\alpha_s$, $\beta_s$, $\gamma_s$, $\delta_s$, $\varepsilon_s$) of in-service filter 700 is consistently above the breakthrough curves (see curves for $\alpha$, $\beta$, $\gamma$, $\delta$, $\varepsilon$) of in-service filter 700, which indicates that the in-service filter 700 may be oversized for its application within in-service passenger vehicle 300. Similarly, removal efficiency of the in-service filter 700 that is consistently below the one or more breakthrough curves for the contaminants (which in this example are compounds $\alpha$, $\beta$, $\gamma$, $\delta$, $\varepsilon$) being evaluated may indicate that the in-service filter 700 is undersized for its application within in-service passenger vehicle 300. Here the breakthrough curves of the present disclosure provide an understanding of the degradation profile of a given filter and the breakthrough curves can be used to generate, for each filter type, a remaining lifespan for a variety of contaminants.

Referring to FIGS. 8, 9A, 9B, 10, 11A, and 11B, based on the correlation between the predetermined service life time and a performance of the in-service filter 700, as determined from the breakthrough curves, air filtration 430 for a second passenger vehicle 400 is sized (FIG. 11B, Block 1190). The second passenger vehicle 400 may be a passenger vehicle that is in development/in the design phase or an existing passenger vehicle whose air purification system is being modified. For exemplary purposes only, sizing of the air filtration 430 may include determining a lifespan for a passenger vehicle filter 800 of the air purification system 420 of the second passenger vehicle 400 from based on reading a volume of one or more corresponding breakthrough curves in the breakthrough curve lookup tables 1000, and based on the air flow rate through the filters. It is noted that the breakthrough curves are dependent on the residence time $\tau$ (i.e., an amount of time the air spends contained within the filter itself) of the filter where $$\tau = V/Q$$

V is the volume of the filter, and Q is the flow rate of air through the filter. An increase in residence time $\tau$ increases the removal efficiency of the filter (i.e., shifts the breakthrough curve upwards on the graphs and flattens the breakthrough curves) which can extend the lifespan of the filter or give higher end of life efficiency. Increasing the residence time $\tau$ may also increase the pressure drop across the filter. The volume of the filter is calculated by multiplying the facial surface area (i.e., length and width) of the filter by the depth (i.e., thickness) of the filter, where varying the volume and the flow rate (e.g., the flow rate varies by the same relative amount as the variance in volume) provides for different shaped filters that have the same residence time. Given the above relationship between the residence time, the volume, and the flow rate of air through the filter, the passenger vehicle filter 800 can be sized based on where the removal efficiency of the in-service filter 700 is in relation to the breakthrough curves, known parameters (i.e., air flow rates, size constraints, etc.) of the air purification system 420 of the second passenger vehicle, the passenger vehicle, and a desired end of life efficiency. Sizing of the passenger vehicle filter 800 may include adjusting dimensions (length, width, depth) of the filter, changing the residence time of the filter, and changing the flow rate of air through the filter. In one aspect, sizing the air filtration 430 for the second passenger vehicle 400 comprises determining a volume 810 of the passenger vehicle filter 800 where the residence time 820 of the passenger vehicle filter 800 is a fixed predetermined value, such as for example, about 0.5 seconds (or in other aspects, the residence time may be more or less than about 0.5 seconds). In another aspect, sizing the air filtration 430 for the second passenger vehicle 400 comprises determining the volume 810 of the passenger vehicle filter 800 where an air purification system air flow rate Q of the passenger vehicle filter 800 is a fixed predetermined value. In one aspect, the desired end of life efficiency is between about 30% and about 20% efficiency for at least one contaminant of the multiple contaminant mixture, while other aspects the desired end of life efficiency may greater than about 30% or less than about 20% for at least one contaminant of the multiple contaminant mixture. Here, the sizing the air filtration 430 for the second passenger vehicle 400 comprises determining a volume 810 of the passenger vehicle filter 800 so that the passenger vehicle filter has an end of life filtration efficiency between 20% and 30% for at least one contaminant of the multiple contaminant mixture.

The controller 182 may be configured, e.g., with any suitable neural network or through with suitable program into which design parameters of the air purification system 420 of the second passenger vehicle 400 are input, where the neural network (trained with the breakthrough curve lookup tables) or program using the lookup tables determines the correlation between the in-service filter 700 and the breakthrough curves generated with the test filters 600. The controller 182 includes a user interface 181 where a user may vary the residence time or other parameters of the passenger vehicle filter 800 so that the passenger vehicle filter 800 has an end of life efficiency of between about 30% and about 20% for a given life time of the passenger vehicle filter 800. The controller 182 may output (either on a display or a printed document) the passenger vehicle filter 800 requirements for selection of an existing or manufacture of a new filter.

Referring to Figs. Referring to FIGS. 2, 3, 4, 6, 9A, 9B, 10, 11A, and 11B a method for evaluating an air purification system 420 using the filter test station 100 includes generating, with the filter test station 100, breakthrough curve lookup tables 1000 for predetermined air flow rates and corresponding to test filters 600 having predetermined filter volumes 610 and predetermined filtration media 630 (FIG. 12, Block 1200). The breakthrough curves are generated in a manner substantially similar to that described above. In-service filter downstream concentrations 110CDS for each contaminant 110I1-110In of the multiple contaminant mixture 110 in the downstream air flow 199D on a downstream side of the in-service filter 700 is measured with the filter test station 100 (FIG. 12, Block 1210) in a manner substantially similar to that described above, where the in-service filter 700 is taken from a first (e.g., in-service) passenger vehicle 300 at a predetermined service life time (e.g., at a predetermined point in the service life of the in-service filter). The air filtration 430 for the second passenger vehicle 400 is sized based on the correlation between the predetermined service life time and the performance of the in-service filter 700 (FIG. 12. Block 1220) in a manner substantially similar to that described above, where the correlation is determined based on the in-service filter downstream concentrations 110CDS and the breakthrough curve lookup tables 1000.

Referring to Figs. Referring to FIGS. 2, 3, 4, 6, 9A, 9B, 10, 11A, and 11B a method for evaluating an air purification system 420 using the filter test station 100 includes injecting, with the filter test station 100, a multiple contaminant mixture 110 into the upstream air flow 199U on an upstream side of an in-service filter 700 (FIG. 13, Block 1300) in a manner substantially similar to that described above, where the in-service filter 700 is taken from the first (e.g., in-service) passenger vehicle 300 at the predetermined service life time. The in-service filter downstream concentrations 110CDS for each contaminant 110I1-110In of the multiple contaminant mixture 110 in the downstream air flow 199D on a downstream side of the in-service filter 700 is measured with the filter test station 100 (FIG. 13, Block 1310) in a manner substantially similar to that described above. The air filtration 430 for the second passenger vehicle 400 is sized, in a manner substantially similar to that described above, based on the correlation between the predetermined service life time and the performance of the in-service filter 700 (FIG. 13, Block 1320), where the correlation is determined based on the in-service filter downstream concentrations 110CDS and breakthrough curve lookup tables 1000 (as described above), and the breakthrough curve lookup tables 1000 are generated with the multiple contaminant mixture 110 (as described above).

The following are provided in accordance with the aspects of the present disclosure:

A1. A method for evaluating an air purification system, the method comprising:
generating, with an air flow generator, a flow of air through a test filter so that an upstream air flow exists an upstream side of the test filter and a downstream air flow exists on a downstream side of the test filter;
injecting, with a fluid injector, a multiple contaminant mixture into the upstream air flow;
measuring, with a contaminant measurement device, downstream concentrations for each contaminant of the multiple contaminant mixture in the downstream air flow; and
generating, based on the downstream concentrations for each contaminant of the multiple contaminant mixture, test filter breakthrough curves for each contaminant of the multiple contaminant mixture in the downstream air flow.

A2. The method of paragraph A1, wherein the multiple contaminant mixture is provided to the fluid injector as a premixed liquid or a premixed gas.

A3. The method of paragraph A1, wherein each contaminant of the multiple contaminant mixture is individually provided to the fluid injector.

A4. The method of paragraph A1, wherein the multiple contaminant mixture is injected into the upstream air flow at a fixed rate.

A5. The method of paragraph A1, wherein the multiple contaminant mixture is injected into the upstream air flow at a varied rate.

A6. The method of paragraph A1, further comprising:
measuring, with the contaminant measurement device, upstream concentrations for each contaminant of the multiple contaminant mixture in the upstream air flow; and
adjusting, based on the upstream concentrations, one or more of both a flow rate of the multiple contaminant mixture and a flow rate of the upstream air flow to dilute the multiple contaminant mixture to a predetermined upstream concentration.

A7. The method of paragraph A6, wherein the predetermined upstream concentration is less than or equal to 100 parts per billion.

A8. The method of paragraph A1, further comprising generating the multiple contaminant mixture based on in-service gas samples from a passenger vehicle cabin.

A9. The method of paragraph A8, wherein the passenger vehicle cabin is an aircraft cabin.

A10. The method of paragraph A1, further comprising generating the multiple contaminant mixture based on gas samples taken from a test chamber housing human occupants.

A11. The method of paragraph A1, wherein the multiple contaminant mixture comprises at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans.

A12. The method of paragraph A1, wherein the test filter is a new filter and the downstream concentrations for each contaminant of the multiple contaminant mixture are obtained over a time period ranging from several hundred hours to several thousand hours.

A13. The method of paragraph A12, wherein the time period is a continuous time period.

A14. The method of paragraph A12, wherein the time period is divided into several test intervals with time periods of static test conditions between the test intervals.

A15. The method of paragraph A14, wherein the test intervals and time periods of static test conditions are configured to mimic excursion patterns of a passenger vehicle.

A16. The method of paragraph A12, wherein the time period is divided into several test intervals with time periods of clean air flow, through the test filter, between test intervals.

A17. The method of paragraph A1, wherein the flow of air is pushed through the test filter by the air flow generator.

A18. The method of paragraph A1, wherein the flow of air is pulled through the test filter by the air flow generator.

A19. The method of paragraph A1, wherein the contaminant measurement device comprises a mass spectrometer.

A20. The method of paragraph A1, further comprising:
generating, with the air flow generator, a second flow of air through an in-service filter so that the upstream air flow exists an upstream side of the in-service filter and the downstream air flow exists on a downstream side of the in-service filter, the in-service filter being taken from a first passenger vehicle at a predetermined service life time and having a same filtration media as the test filter;
injecting, with the fluid injector, the multiple contaminant mixture into the upstream air flow;
measuring, with the contaminant measurement device, in-service filter downstream concentrations for each contaminant of the multiple contaminant mixture in the downstream air flow;
determining, based on the test filter breakthrough curves and the in-service filter downstream concentrations, a correlation between the predetermined service life time and a performance of the in-service filter; and
sizing air filtration for a second passenger vehicle based on the correlation between the predetermined service life time and a performance of the in-service filter.

A21. The method of paragraph A20, wherein the in-service filter downstream concentrations for each contaminant of the multiple contaminant mixture are obtained after a restoration time period that accounts for off-gassing of the in-service filter between a time the in-service filter was taken from the first passenger vehicle and testing of the in-service filter, so as to remove off-gassing effects from the in-service filter downstream concentrations.

A22. The method of paragraph A21, wherein the restoration time period ranges from fifty hours to one-hundred hours.

A23. The method of paragraph A20, wherein the in-service filter has a same residence time as the test filter.

A24. The method of paragraph A20, wherein sizing the air filtration for the second passenger vehicle comprises determining a volume of a passenger vehicle filter of the second passenger vehicle where a residence time of the passenger vehicle filter is a fixed predetermined value.

A25. The method of paragraph A20, wherein sizing the air filtration for the second passenger vehicle comprises determining a volume of a passenger vehicle filter of the second passenger vehicle where an air purification system air flow rate of the passenger vehicle filter is a fixed predetermined value.

A26. The method of paragraph A20, wherein sizing the air filtration for the second passenger vehicle comprises determining a volume of a passenger vehicle filter of the second passenger vehicle so that the passenger vehicle filter has an end of life filtration efficiency between 20% and 30% for at least one contaminant of the multiple contaminant mixture.

B1. A method for evaluating an air purification system, the method comprising:
generating, with a filter test station, breakthrough curve lookup tables for predetermined air flow rates and corresponding to test filters having predetermined filter volumes and predetermined filtration media, where breakthrough curves of the breakthrough curve lookup tables are generated by
injecting, with the filter test station, a multiple contaminant mixture into an upstream air flow on an upstream side of a test filter of the test filters, and
measuring downstream concentrations of contaminants in the multiple contaminant mixture in a downstream air flow on a downstream side of the test filter;
measuring, with the filter test station, in-service filter downstream concentrations for contaminants of the multiple contaminant mixture in the downstream air flow on a downstream side of an in-service filter, the in-service filter being taken from a first passenger vehicle at a predetermined service life time; and
sizing air filtration for a second passenger vehicle based on a correlation between the predetermined service life time and a performance of the in-service filter, where the correlation is determined based on the in-service filter downstream concentrations and the breakthrough curve lookup tables.

B2. The method of paragraph B1, wherein generating the breakthrough curve lookup tables comprises:
generating, with an air flow generator of the filter test station, a flow of air through the test filter so that an upstream air flow exists the upstream side of the test filter and a downstream air flow exists on the downstream side of the test filter;
injecting, with a fluid injector of the filter test station, the multiple contaminant mixture into the upstream air flow;
measuring, with a contaminant measurement device of the filter test station, downstream concentrations for each contaminant of the multiple contaminant mixture in the downstream air flow; and
generating, based on the downstream concentrations for each contaminant of the multiple contaminant mixture, test filter breakthrough curves for each contaminant of the multiple contaminant mixture in the downstream air flow.

B3. The method of paragraph B2, wherein the multiple contaminant mixture is provided to the fluid injector as a premixed liquid or a premixed gas.

B4. The method of paragraph B2, wherein each contaminant of the multiple contaminant mixture is individually provided to the fluid injector.

B5. The method of paragraph B2, wherein the multiple contaminant mixture is injected into the upstream air flow at a fixed rate.

B6. The method of paragraph B2, wherein the multiple contaminant mixture is injected into the upstream air flow at a varied rate.

B7. The method of paragraph B2, further comprising:
measuring, with the contaminant measurement device, upstream concentrations for each contaminant of the multiple contaminant mixture in the upstream air flow; and
adjusting, based on the upstream concentrations, one or more of both a flow rate of the multiple contaminant mixture and a flow rate of the upstream air flow to dilute the multiple contaminant mixture to a predetermined upstream concentration.

B8. The method of paragraph B7, wherein the predetermined upstream concentration is less than or equal to 100 parts per billion.

B9. The method of paragraph B2, further comprising generating the multiple contaminant mixture based on in-service gas samples from a passenger vehicle cabin.

B10. The method of paragraph B9, wherein the passenger vehicle cabin is an aircraft cabin.

B11. The method of paragraph B2, further comprising generating the multiple contaminant mixture based on gas samples taken from a test chamber housing human occupants.

B12. The method of paragraph B2, wherein the multiple contaminant mixture comprises at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans.

B13. The method of paragraph B2, wherein the test filter is a new filter and the downstream concentrations for each contaminant of the multiple contaminant mixture are obtained over a time period ranging from several hundred hours to several thousand hours.

B14. The method of paragraph B13, wherein the time period is a continuous time period.

B15. The method of paragraph B13, wherein the time period is divided into several test intervals with time periods of static test conditions between the test intervals.

B16. The method of paragraph B15, wherein the test intervals and time periods of static test conditions are configured to mimic excursion patterns of a passenger vehicle.

B17. The method of paragraph B13, wherein the time period is divided into several test intervals with time periods of clean air flow, through the test filter, between test intervals.

B18. The method of paragraph B2, wherein the flow of air is pushed through the test filter by the air flow generator.

B19. The method of paragraph B2, wherein the flow of air is pulled through the test filter by the air flow generator.

B20. The method of paragraph B2, wherein the contaminant measurement device comprises a mass spectrometer.

B21. The method of paragraph B1, wherein measuring the in-service filter downstream concentrations comprises:
    generating, with an air flow generator of the filter test station, a second flow of air through the in-service filter so that an upstream air flow exists an upstream side of the in-service filter and a downstream air flow exists on a downstream side of the in-service filter; and
    injecting, with a fluid injector of the filter test station, the multiple contaminant mixture into the upstream air flow.

B22. The method of paragraph B21, wherein the in-service filter downstream concentrations for each contaminant of the multiple contaminant mixture are obtained after a restoration time period that accounts for off-gassing of the in-service filter between a time the in-service filter was taken from the first passenger vehicle and testing of the in-service filter, so as to remove off-gassing effects from the in-service filter downstream concentrations.

B23. The method of paragraph B22, wherein the restoration time period ranges from fifty hours to one-hundred hours.

B24. The method of paragraph B21, wherein the in-service filter has a same residence time as the test filter.

B25. The method of paragraph B21, wherein sizing the air filtration for the second passenger vehicle comprises determining a volume of a passenger vehicle filter of the second passenger vehicle where a residence time of the passenger vehicle filter is a fixed predetermined value.

B26. The method of paragraph B21, wherein sizing the air filtration for the second passenger vehicle comprises determining a volume of a passenger vehicle filter of the second passenger vehicle where an air purification system air flow rate of the passenger vehicle filter is a fixed predetermined value.

B27. The method of paragraph B21, wherein sizing the air filtration for the second passenger vehicle comprises determining a volume of a passenger vehicle filter of the second passenger vehicle so that the passenger vehicle filter has an end of life filtration efficiency between 20% and 30% for at least one contaminant of the multiple contaminant mixture.

C1. A method for evaluating an air purification system, the method comprising:
    injecting, with a filter test station, a multiple contaminant mixture into an upstream air flow on an upstream side of an in-service filter, the in-service filter being taken from a first passenger vehicle at a predetermined service life time;
    measuring, with the filter test station, in-service filter downstream concentrations for each contaminant of the multiple contaminant mixture in a downstream air flow on a downstream side of the in-service filter; and
    sizing air filtration for a second passenger vehicle based on a correlation between the predetermined service life time and a performance of the in-service filter, where the correlation is determined based on the in-service filter downstream concentrations and breakthrough curve lookup tables, the breakthrough curve lookup tables being generated with the multiple contaminant mixture.

C2. The method of paragraph C1, wherein generating the breakthrough curve lookup tables comprises:
    generating, with an air flow generator of the filter test station, a flow of air through a test filter so that an upstream air flow exists the upstream side of the test filter and a downstream air flow exists on the downstream side of the test filter;
    injecting, with a fluid injector of the filter test station, the multiple contaminant mixture into the upstream air flow;
    measuring, with a contaminant measurement device of the filter test station, downstream concentrations for each contaminant of the multiple contaminant mixture in the downstream air flow; and
    generating, based on the downstream concentrations for each contaminant of the multiple contaminant mixture, breakthrough curves of the test filter for each contaminant of the multiple contaminant mixture in the downstream air flow.

C3. The method of paragraph C2, wherein the multiple contaminant mixture is provided to the fluid injector as a premixed liquid or a premixed gas.

C4. The method of paragraph C2, wherein each contaminant of the multiple contaminant mixture is individually provided to the fluid injector.

C5. The method of paragraph C2, wherein the multiple contaminant mixture is injected into the upstream air flow at a fixed rate.

C6. The method of paragraph C2, wherein the multiple contaminant mixture is injected into the upstream air flow at a varied rate.

C7. The method of paragraph C2, further comprising:
    measuring, with the contaminant measurement device, upstream concentrations for each contaminant of the multiple contaminant mixture in the upstream air flow; and
    adjusting, based on the upstream concentrations, one or more of both a flow rate of the multiple contaminant mixture and a flow rate of the upstream air flow to dilute the multiple contaminant mixture to a predetermined upstream concentration.

C8. The method of paragraph C7, wherein the predetermined upstream concentration is less than or equal to 100 parts per billion.

C9. The method of paragraph C2, further comprising generating the multiple contaminant mixture based on in-service gas samples from a passenger vehicle cabin.

C10. The method of paragraph C9, wherein the passenger vehicle cabin is an aircraft cabin.

C11. The method of paragraph C2, further comprising generating the multiple contaminant mixture based on gas samples taken from a test chamber housing human occupants.

C12. The method of paragraph C2, wherein the multiple contaminant mixture comprises at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans.

C13. The method of paragraph C2, wherein the test filter is a new filter and the downstream concentrations for each contaminant of the multiple contaminant mixture are obtained over a time period ranging from several hundred hours to several thousand hours.

C14. The method of paragraph C13, wherein the time period is a continuous time period.

C15. The method of paragraph C13, wherein the time period is divided into several test intervals with time periods of static test conditions between the test intervals.

C16. The method of paragraph C15, wherein the test intervals and time periods of static test conditions are configured to mimic excursion patterns of a passenger vehicle.

C17. The method of paragraph C13, wherein the time period is divided into several test intervals with time periods of clean air flow, through the test filter, between test intervals.

C18. The method of paragraph C2, wherein the flow of air is pushed through the test filter by the air flow generator.

C19. The method of paragraph C2, wherein the flow of air is pulled through the test filter by the air flow generator.

C20. The method of paragraph C2, wherein the contaminant measurement device comprises a mass spectrometer.

C21. The method of paragraph C1, wherein measuring the in-service filter downstream concentrations comprises generating, with an air flow generator of the filter test station, a flow of air through the in-service filter so that the upstream air flow exists an upstream side of the in-service filter and a downstream air flow exists on a downstream side of the in-service filter.

C22. The method of paragraph C21, wherein and the in-service filter downstream concentrations for each contaminant of the multiple contaminant mixture are obtained after a restoration time period that accounts for off-gassing of the in-service filter between a time the in-service filter was taken from the first passenger vehicle and testing of the in-service filter, so as to remove off-gassing effects from the in-service filter downstream concentrations.

C23. The method of paragraph C22, wherein the restoration time period ranges from fifty hours to one-hundred hours.

C24. The method of paragraph C21, wherein the in-service filter has a same residence time as a test filter used to generate the breakthrough curve lookup tables.

C25. The method of paragraph C21, wherein sizing the air filtration for the second passenger vehicle comprises determining a volume of a passenger vehicle filter of the second passenger vehicle where a residence time of the passenger vehicle filter is a fixed predetermined value.

C26. The method of paragraph C21, wherein sizing the air filtration for the second passenger vehicle comprises determining a volume of a passenger vehicle filter of the second passenger vehicle where an air purification system air flow rate of the passenger vehicle filter is a fixed predetermined value.

C27. The method of paragraph C21, wherein sizing the air filtration for the second passenger vehicle comprises determining a volume of a passenger vehicle filter of the second passenger vehicle so that the passenger vehicle filter has an end of life filtration efficiency between 20% and 30% for at least one contaminant of the multiple contaminant mixture.

C28. The method of paragraph C1, further comprising:
measuring, with a contaminant measurement device of the filter test station, upstream concentrations for each contaminant of the multiple contaminant mixture in the upstream air flow; and
adjusting, based on the upstream concentrations, one or more of both a flow rate of the multiple contaminant mixture and a flow rate of the upstream air flow to dilute the multiple contaminant mixture to a predetermined upstream concentration.

C29. The method of paragraph C28, wherein the predetermined upstream concentration is less than or equal to 100 parts per billion.

C30. The method of paragraph C1, further comprising generating the multiple contaminant mixture based on in-service gas samples from a passenger vehicle cabin.

C31. The method of paragraph C30, wherein the passenger vehicle cabin is an aircraft cabin.

C32. The method of paragraph C1, further comprising generating the multiple contaminant mixture based on gas samples taken from a test chamber housing human occupants.

C33. The method of paragraph C1, wherein the multiple contaminant mixture comprises at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans.

C34. The method of paragraph C1, wherein a flow of air, that comprises the upstream air flow, is pushed through the in-service filter by an air flow generator of the filter test station.

C35. The method of paragraph C1, wherein a flow of air, that comprises the upstream air flow, is pulled through the in-service filter by an air flow generator of the filter test station.

C36. The method of paragraph C1, wherein the in-service filter downstream concentrations for each contaminant of the multiple contaminant mixture in the downstream air flow are measured by a mass spectrometer of the filter test station.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 11A, 11B, 12, and 13, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 11A, 11B, 12, and 13 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts are described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method for evaluating an air purification system, the method comprising:
   generating, with an air flow generator, a flow of air through a test filter so that an upstream air flow exists on an upstream side of the test filter and a downstream air flow exists on a downstream side of the test filter;
   injecting, with a fluid injector, a multiple contaminant mixture into the upstream air flow;
   measuring, with a contaminant measurement device, downstream concentrations for each contaminant of the multiple contaminant mixture in the downstream air flow;
   generating, based on the downstream concentrations for each contaminant of the multiple contaminant mixture, test filter breakthrough curves for each contaminant of the multiple contaminant mixture in the downstream air flow;
   measuring, with the contaminant measurement device, upstream concentrations for each contaminant of the multiple contaminant mixture in the upstream air flow; and adjusting, based on the upstream concentrations, one or more of both a flow rate of the multiple contaminant mixture and a flow rate of the upstream air flow to dilute the multiple contaminant mixture to a predetermined upstream concentration.

2. The method of claim 1, wherein the multiple contaminant mixture is provided to the fluid injector as a premixed liquid or a premixed gas.

3. The method of claim 1, wherein the predetermined upstream concentration is less than or equal to 100 parts per billion.

4. The method of claim 1, further comprising generating the multiple contaminant mixture based on in-service gas samples from a passenger vehicle cabin.

5. The method of claim 1, further comprising generating the multiple contaminant mixture based on gas samples taken from a test chamber housing human occupants.

6. The method of claim 1, wherein the multiple contaminant mixture comprises at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans.

7. The method of claim 1, wherein the test filter is a new filter and the downstream concentrations for each contaminant of the multiple contaminant mixture are obtained over a time period ranging from several hundred hours to several thousand hours.

8. The method of claim 1, further comprising:
generating, with the air flow generator, a second flow of air through an in-service filter so that the upstream air flow exists an upstream side of the in-service filter and the downstream air flow exists on a downstream side of the in-service filter, the in-service filter being taken from a first passenger vehicle at a predetermined service life time and having a same filtration media as the test filter;
injecting, with the fluid injector, the multiple contaminant mixture into the upstream air flow;
measuring, with the contaminant measurement device, in-service filter downstream concentrations for each contaminant of the multiple contaminant mixture in the downstream air flow;
determining, based on the test filter breakthrough curves and the in-service filter downstream concentrations, a correlation between the predetermined service life time and a performance of the in-service filter; and
sizing air filtration for a second passenger vehicle based on the correlation between the predetermined service life time and a performance of the in-service filter.

9. The method of claim 8, wherein the in-service filter downstream concentrations for each contaminant of the multiple contaminant mixture are obtained after a restoration time period that accounts for off-gassing of the in-service filter between a time the in-service filter was taken from the first passenger vehicle and testing of the in-service filter, so as to remove off-gassing effects from the in-service filter downstream concentrations.

10. A method for evaluating an air purification system, the method comprising:
generating, with a filter test station, breakthrough curve lookup tables for predetermined air flow rates and corresponding to test filters having predetermined filter volumes and predetermined filtration media, where breakthrough curves of the breakthrough curve lookup tables are generated by
injecting, with the filter test station, a multiple contaminant mixture into an upstream air flow on an upstream side of a test filter of the test filters, and
measuring downstream concentrations of contaminants in the multiple contaminant mixture in a downstream air flow on a downstream side of the test filter;
measuring, with the filter test station, in-service filter downstream concentrations for contaminants of the multiple contaminant mixture in the downstream air flow on a downstream side of an in-service filter, the in-service filter being taken from a first passenger vehicle at a predetermined service life time; and
sizing air filtration for a second passenger vehicle based on a correlation between the predetermined service life time and a performance of the in-service filter, where the correlation is determined based on the in-service filter downstream concentrations and the breakthrough curve lookup tables.

11. The method of claim 10, wherein measuring the in-service filter downstream concentrations comprises:
generating, with an air flow generator of the filter test station, a second flow of air through the in-service filter so that the upstream air flow exists an upstream side of the in-service filter and the downstream air flow exists on a downstream side of the in-service filter; and
injecting, with a fluid injector of the filter test station, the multiple contaminant mixture into the upstream air flow.

12. The method of claim 11, wherein the in-service filter downstream concentrations for each contaminant of the multiple contaminant mixture are obtained after a restoration time period that accounts for off-gassing of the in-service filter between a time the in-service filter was taken from the first passenger vehicle and testing of the in-service filter, so as to remove off-gassing effects from the in-service filter downstream concentrations.

13. The method of claim 11, wherein the in-service filter has a same residence time as the test filter.

14. The method of claim 11, wherein sizing the air filtration for the second passenger vehicle comprises determining a volume of a passenger vehicle filter of the second passenger vehicle where a residence time of the passenger vehicle filter is a fixed predetermined value.

15. The method of claim 11, wherein sizing the air filtration for the second passenger vehicle comprises determining a volume of a passenger vehicle filter of the second passenger vehicle where an air purification system air flow rate of the passenger vehicle filter is a fixed predetermined value.

16. A method for evaluating an air purification system, the method comprising:
injecting, with a filter test station, a multiple contaminant mixture into an upstream air flow on an upstream side of an in-service filter, the in-service filter being taken from a first passenger vehicle at a predetermined service life time;
measuring, with the filter test station, in-service filter downstream concentrations for each contaminant of the multiple contaminant mixture in a downstream air flow on a downstream side of the in-service filter; and
sizing air filtration for a second passenger vehicle based on a correlation between the predetermined service life time and a performance of the in-service filter, where the correlation is determined based on the in-service filter downstream concentrations and breakthrough curve lookup tables, the breakthrough curve lookup tables being generated with the multiple contaminant mixture.

17. The method of claim 16, wherein measuring the in-service filter downstream concentrations comprises generating, with an air flow generator of the filter test station, a flow of air through the in-service filter so that the upstream air flow exists on an upstream side of the in-service filter and the downstream air flow exists on a downstream side of the in-service filter.

18. The method of claim 17, wherein sizing the air filtration for the second passenger vehicle comprises determining a volume of a passenger vehicle filter of the second passenger vehicle so that the passenger vehicle filter has an end of life filtration efficiency between 20% and 30% for at least one contaminant of the multiple contaminant mixture.

19. The method of claim 16, further comprising:
measuring, with a contaminant measurement device of the filter test station, upstream concentrations for each contaminant of the multiple contaminant mixture in the upstream air flow; and
adjusting, based on the upstream concentrations, one or more of both a flow rate of the multiple contaminant mixture and a flow rate of the upstream air flow to dilute the multiple contaminant mixture to a predetermined upstream concentration.

20. The method of claim 16, wherein the multiple contaminant mixture comprises at least two or more of organic acids, alkanes, aldehydes, alcohols, alkenes, aromatics, chlorocarbons, esters, ethers, ketones, nitrogenous, isoalkanes, phosphates, perfluro derivatives, phthalates, siloxanes, terpenes, thiols, and mercaptans.

* * * * *